Figure 1:
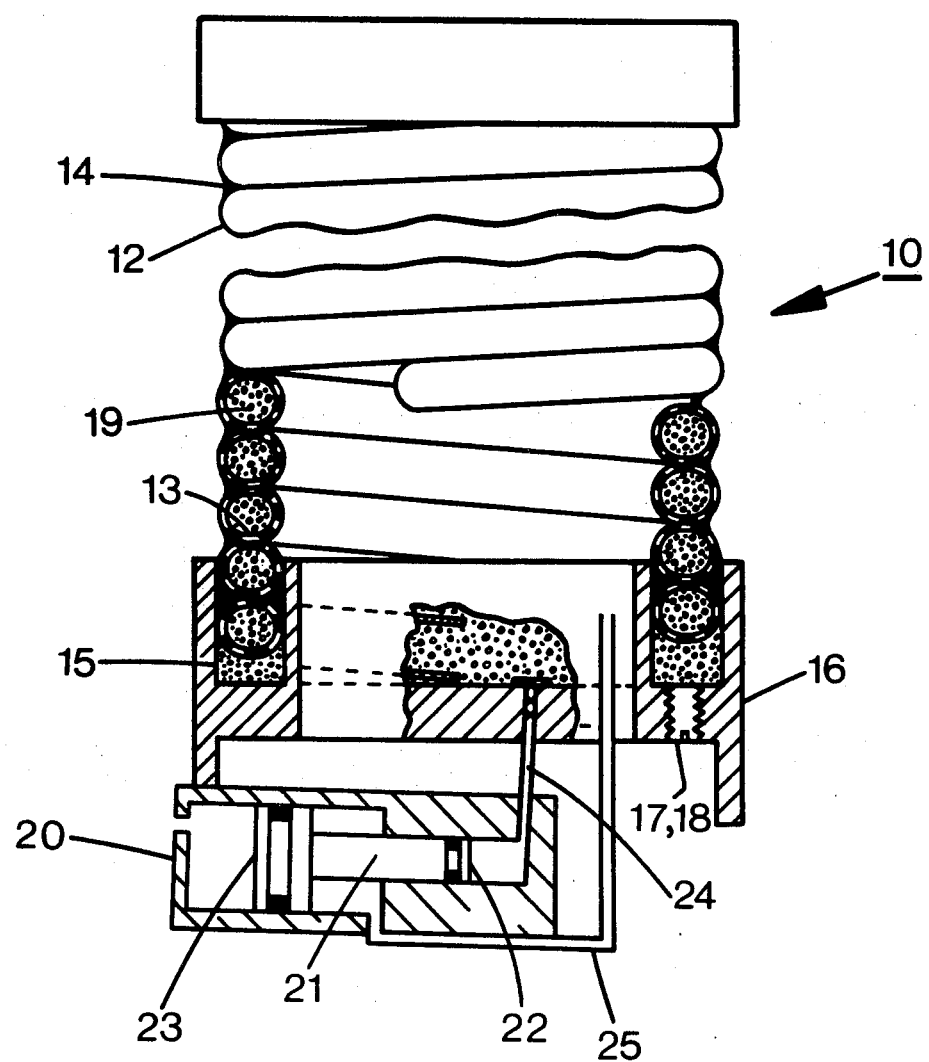

United States Patent [19]

Carnegie

[11] 4,164,042

[45] Aug. 14, 1979

[54] WALL STRUCTURES SUCH AS FOR USE IN DEEP DIVING APPARATUS

[75] Inventor: Alistair L. Carnegie, Yeovil, England

[73] Assignee: Normalair-Garrett (Holdings) Limited, Somerset, United Kingdom

[21] Appl. No.: 851,416

[22] Filed: Nov. 14, 1977

[30] Foreign Application Priority Data

Nov. 18, 1976 [GB] United Kingdom ............... 48129/76

[51] Int. Cl.² ............................................ B63C 11/04
[52] U.S. Cl. .................................................. 2/2.1 R
[58] Field of Search ............................ 2/2.1 R, 2.1 A; 285/226; 138/129, 131, 141, 144, 145; 52/245, 749

[56] References Cited

U.S. PATENT DOCUMENTS

| | | | |
|---|---|---|---|
| 2,890,264 | 6/1959 | Duff | 138/131 X |
| 3,329,967 | 7/1967 | Martinez et al. | 2/2.1 R |
| 3,621,542 | 11/1971 | Getchell | 2/2.1 A |

FOREIGN PATENT DOCUMENTS

1023690 1/1958 Fed. Rep. of Germany ........... 2/2.1 R

*Primary Examiner*—Dorsey Newton
*Attorney, Agent, or Firm*—Larson, Taylor and Hinds

[57] ABSTRACT

A wall structure for use in forming part of an enclosure that is subject to high pressure differential between its external and internal environments comprises tubing that has been flattened over two diametrically opposed areas and helically wound so as to be contiguous along the flattened areas. The interior of the tubing is filled with a substantially incompressible flexible medium. Means are provided for pressurizing the flexible medium, at least during periods of operation when the enclosure is subjected to a substantial pressure difference between its external and internal environments, so as to balance some of the loads acting on the wall structure due to the pressure differential. The wall structure is particularly suitable for use in forming parts of a deep diving suit or other deep diving and submersible enclosures.

8 Claims, 4 Drawing Figures

WALL STRUCTURES SUCH AS FOR USE IN DEEP DIVING APPARATUS

This invention relates to a wall structure for use in forming at least a part of an enclosure that is subjected to high external pressure relative to its internal pressure. The invention is particularly, although not exclusively, concerned with a wall structure of particular utility in the construction of deep diving enclosures that provide an environment at normal or near normal atmospheric pressure. Such deep diving enclosures include diving suits, diving chambers and other occupant enclosure devices, as well as crewless enclosure devices falling within the term "submersibles." A wall structure in accordance with the invention is also suited for use in forming at least a part of an enclosure for containing vacuum conditions.

At depths below 1,200 feet a diver needs almost all his energy to breathe, and consequently his work effort diminishes with depth. Furthermore, long-term operations at pressure create several immediate problems, such as rescue in the event of injury, and the long-term effects under such conditions are still not fully known. A diving suit capable of providing internal pressure equivalent to one atmosphere would enable a diver to carry out a high percentage of his normal duties at depths below 1,200 feet, whilst reducing many of the dangers that are at present inherent.

It is essential to produce a one atmosphere diving suit with a good strength to weight ratio. This is particularly true of the limb portions of the suit, since having commenced movement of a limb portion, such as an arm, the momentum of the moving mass of the limb tends to cause it to move beyond its objective, or overshoot, thus making the accomplishment of intricate tasks difficult, time-consuming, and tiring if moved by the physical effort of the diver. In present-day diving suits high strength to weight ratios are obtained by the use of magnesium with, however, the constant risk that in an undersea environment any break in the protective treatment of the metal will lead to corrosion followed by rapid disintegration.

It is an object of the present invention to provide a wall structure that is suited for use in forming at least a part of an enclosure which is subject to high pressure differential between its external and internal environments, whilst being light in weight and so having a high strength to weight ratio without incorporating the risks associated with the use of magnesium when used in a corrosive environment.

Accordingly, the invention provides a wall structure for forming at least a part of an enclosure, said wall structure comprising tubing that is flattened over two diametrically opposed areas and is helically wound so as to be contiguous along the flattened areas, the wall structure being sealed along the contiguous flattened areas of the tubing, the interior of the tubing being filled with a substantially incompressible flexible medium that is pressurised at least during periods of operation when the enclosure is subjected to a substantial pressure differential between its external and internal environments.

The said flexible medium may be a liquid or a solid, that in use becomes pressurised by the compressive action of pressure that is external to the enclosure.

Where the medium is a liquid it may be further pressurised in use by means of a pressure intensifier that is responsive to the external ambient pressure.

Whilst the tubing may be of any suitable material, stainless steel is preferred. The wall structure may be provided with a protected surface, for instance by being coated with a rubber-filled polyurethane lacquer.

A wall structure constructed in accordance with the invention may form a complete hollow body or it may be used to form one or more hollow portions of a hollow body and may have various configurations ranging from a tube to a sphere, e.g. as represented, respectively, by a limb portion of a diving suit and by a bathysphere.

Figure 2:
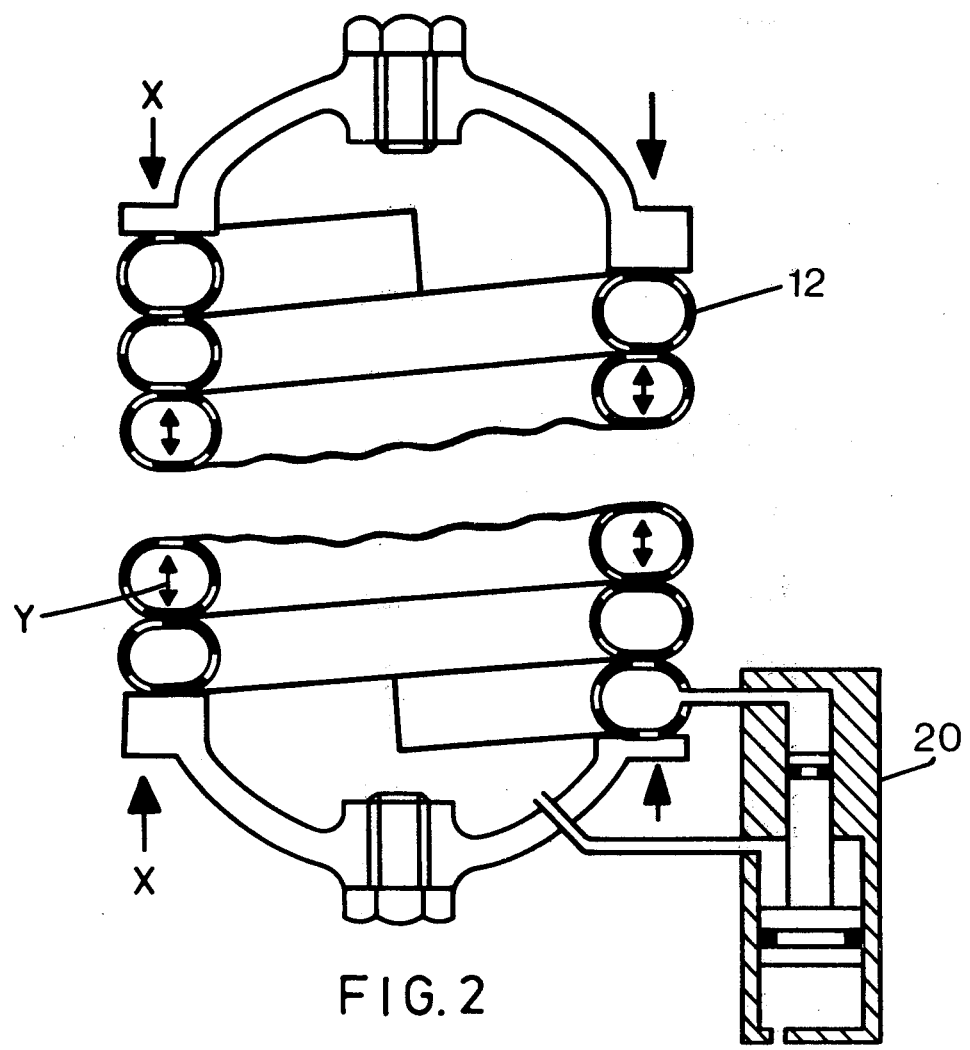
Figure 2A:
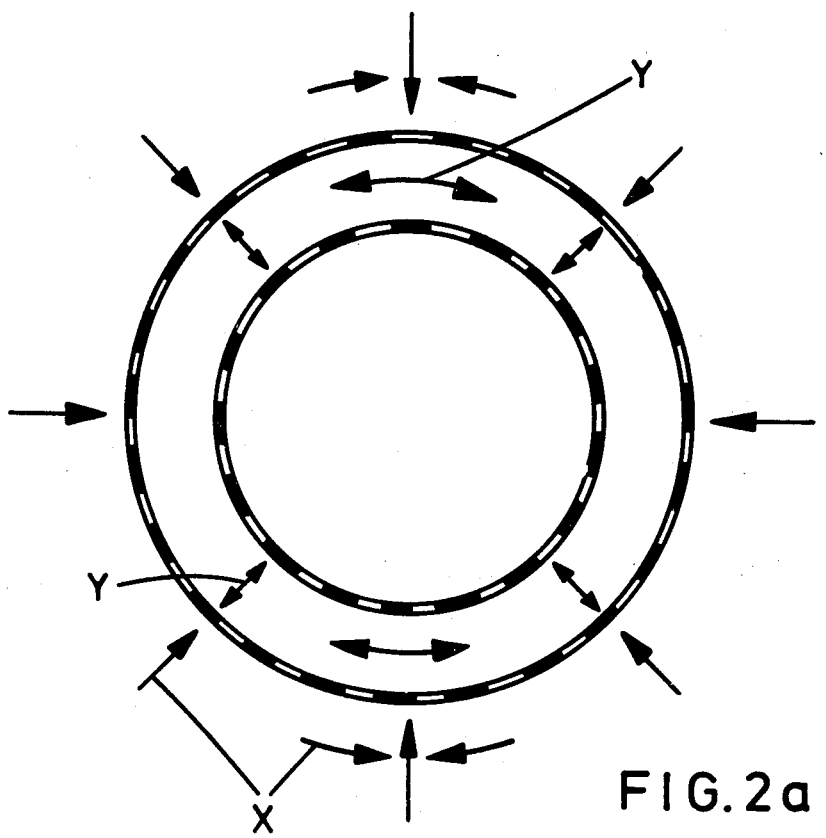
Figure 3:
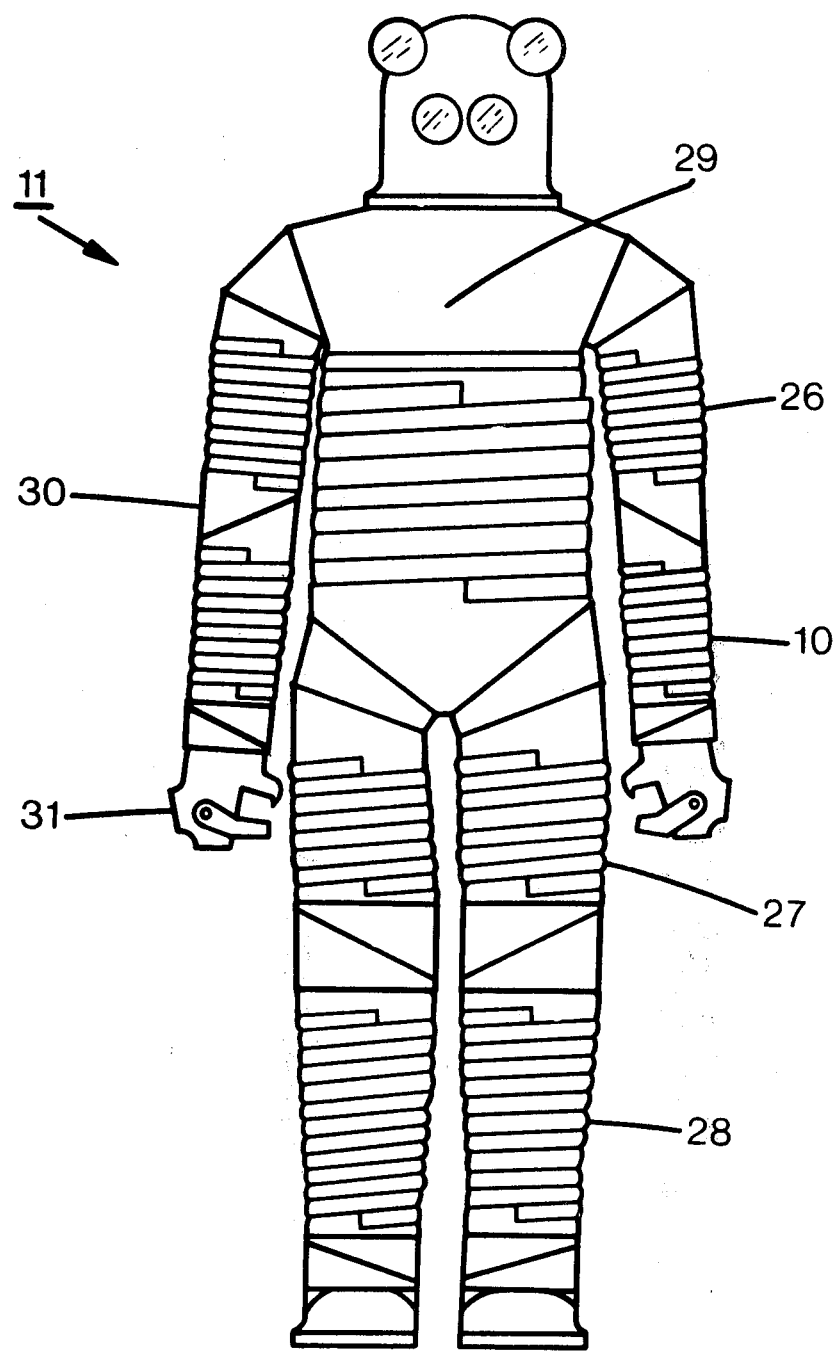

The invention will be more readily understood from the following description of an emodiment which is by way of example, with reference to the accompanying drawings, in which:

FIG. 1 schematically illustrates a fragmentary sectional view of a tubular wall structure, such as for a lower arm portion of a diving suit;

FIGS. 2 and 2a diagrammatically show the stress distribution affecting a tubular structure when subjected to external pressure; and FIG. 3 represents a frontal view of a diving suit utilising the invention.

A wall structure in accordance with the present invention is shown in FIG. 1 and is represented by a lower arm portion 10 of a diving suit 11 shown in FIG. 3. The wall structure comprises stainless steel tubing 12 that is flattened over two diametrically opposed areas before being close wound in a helix so as to form a tubular enclosure. The flattened surfaces 13 of the tubing 12 are contiguously disposed relative one to another and continuously sealed by nicro-brazing 14. The amount that the tubing 12 is flattened varies with the diameter of a coil and increases, within practical limits, with increasing coil diameter. In one example, a 0.5 inch diameter tubing that is capable of operating at internal pressures of 41 360 kPa (6000 lb.f/in$^2$) in ground level conditions when wound to form an enclosure having an inside coil diameter of 5 inches, is flattened to a dimension of 0.375 inches.

The ends of the helical tubing 12 are each located in an annular groove 15 provided in a stainless steel endfitting 16 and nicro-brazed thereto. The complete assembly of the tubing 12 and two end-fittings 16 provide an impervious pressure resistant tubular structure. Each end-fitting 16 is provided with a filler hole 17 and threaded plug 18 therefor, whereby part of the end fittings 16 and the whole interior of the tubing 12 is filled with a substantially incompressible flexible medium 19.

In the illustrated embodiment the flexible medium 19 comprises oil which is sealed in by means of the plugs 18. A pressure intensifier 20 is provided on one of the end fittings 16 and comprises a cylinder housing a piston 21 that has two heads 22, 23, of which the smaller head 22 bears on the oil, whilst the larger head 23 is subject to the difference of the external ambient pressure and the pressure within the arm portion 10, i.e. the internal suit pressure. Ducts 24, 25 traverse the wall of the end fitting to provide, respectively, communication for the oil and the internal atmosphere, e.g. air, within the arm portion 10 to reach the appropriate piston heads 22, 23. The relative areas of the heads 22, 23 are predetermined to produce some chosen pressure ratio of ambient pressure to that within the tubing 12, appropriate to the stress characteristics of the tubing, say 6:1.

The structure is provided with a protective coating (not shown) such as a rubber-filled polyurethane lacquer.

In use of the wall structure as the arm portion 10 of the diving suit 11 shown in FIG. 3, the external ambient pressure applies a compressive load upon the exterior of the structure, which pressurises the substantially incompressible flexible medium 19 due, substantially, to the longitudinal force acting on the coils of tubing 12. As is well known, the resistance to collapse of a cylinder subjected to external pressure is proportional to the moment of inertia of the cross-section of the wall of the cylinder. By using the coiled tubing 12 in the formation of the wall structure of the arm portion 10, the cylinder wall has a high moment of inertia and, therefore, a high stiffness with low weight. Local collapse of the tubing 12, when subjected to increasing high external pressure, is prevented by the medium 19 that fills the tubing 12 becoming pressurised under the compressive load, and eventually balancing the end load acting longitudinally on the structure 10. The flattening of the spirally wound tubing 12, being in the radial plane thereof, gives greater stiffness to its cross-section, thereby providing greater resistance to the load acting radially on the structure 10, which resistance is increased as the medium 19 within the tubing 12 becomes pressurised and tends to impart a tensile force into the walls thereof. Thus the longitudinal and hoop stresses developed in the tubing 12 during a dive, due to the pressure of the surrounding water, are substantially counteracted by the medium 19 filling the tubing. The stress distribution in the structure, in general terms, is illustrated in FIGS. 2 and 2a. In FIG. 2 a section of the lower arm portion 10 is shown as a test-piece fitted with end closure caps and includes a pressure intensifier 20, and illustrates the pressure distribution obtaining in respect of longidutinal stress within the tubing, the internal pressure being represented by arrows Y and the external pressure by arrows X. FIG. 2a illustrates a cross-section through one of the coils of tubing 12 in FIG. 2, and similarly identifies the obtaining internal and external pressures by arrows Y and X, respectively, in respect of hoop stress.

The area of the smaller piston 22 of the pressure intensifier 20 is in contact with the internal pressure exerted by the oil, and the full piston area of the larger piston 23 is in contact with the external pressure exerted by the water, while the intermediate annular area under the large piston head is exposed to the internal enclosure or suit pressure. Any given ratio of larger to smaller piston areas results in the internal pressure in the tubing 12 being intensified in this ratio at all external pressures. Thus the internal pressure in the tubing varies directly with the load exerted on the wall structure by changing external pressure, so that the internal pressure tends to put the tubing 12 into increased tension and reduce the compressive stresses therein that would otherwise occur.

Structure according to this invention is appropriate to use in a one atmosphere diving suit as depicted in FIG. 3, in which areas of usage are seen to include upper and lower arm and leg portions and the torso, 26, 10, 27, 28 and 29 respectively.

Of course, the embodiment of the invention hereinbefore described with reference to and shown in the accompanying drawings is by way of example only, various modifications being possible without departing from the scope of the invention. For instance, it is to be appreciated that the provision of the pressure intensifier 20 when the medium 19 comprises oil is optional. Moreover, the tubing may be filled with a medium other than oil, one suitable alternative being a latex elastomer that may contain hollow glass spheres of, say, approximately 0.025 inch diameter.

Where wall structure according to the invention is utilised in apparatus employing small bore pressure lines, these may be on the outer surface of the tubing or within the bore itself.

I claim as my invention:

1. A wall structure for forming at least a part of an enclosure, said wall structure adapted to be subjected to a high pressure differential between an external environment existing outside the enclosure and an internal environment within the enclosure, said wall structure comprising tubing, said tubing being flattened over two diametrically opposed areas and being helically wound to be contiguous along the flattened areas, means sealing the wall structure along the continuous flattened areas of the tubing, and a substantially incompressible nonrigid medium filling the interior of the tubing, whereby when the enclosure is subjected to a substantial pressure differential between the internal and external environments, the substantially incompressible nonrigid medium is responsive to said pressure differential.

2. A wall structure as claimed in claim 1, wherein the nonrigid medium is a solid elastomer.

3. A wall structure as claimed in claim 2, wherein the elastomer contains hollow glass spheres.

4. A wall structure as claimed in claim 1, wherein the nonrigid medium is a liquid.

5. A wall structure as claimed in claim 4, wherein the liquid is oil.

6. A wall structure as claimed in claim 4 including a pressure intensifier responsive to external ambient pressure and arranged to be effective upon the liquid nonrigid medium.

7. A deep diving suit having at least a portion thereof formed by a wall structure forming an enclosure, the wall structure comprising tubing, said tubing being flattened over two diametrically opposed areas and being helically wound to be contiguous along the flattened areas, means sealing the wall structure along the contiguous flattened areas of the tubing, and a substantially incompressible nonrigid medium filling the interior of the tubing, the substantially incompressible nonrigid medium being pressurized by the compressive action of pressure external to the enclosure.

8. A deep diving suit according to claim 7 and further including means for pressurizing the substantially incompressible nonrigid medium.

* * * * *